US008554675B2

(12) United States Patent
Gupta et al.

(10) Patent No.: US 8,554,675 B2
(45) Date of Patent: *Oct. 8, 2013

(54) PAYMENT SERVICE THAT APPLIES USER-SPECIFIED RULES TO DIVIDE PAYMENT AMOUNTS AMONG MULTIPLE PAYMENT INSTRUMENTS

(75) Inventors: Vikas Gupta, Seattle, WA (US); Jeyandran Venugopal, Bellevue, WA (US); Xiaosi Li, Bainbridge Island, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,841

(22) Filed: Jan. 3, 2012

(65) Prior Publication Data

US 2012/0136752 A1 May 31, 2012

Related U.S. Application Data

(63) Continuation of application No. 10/634,135, filed on Aug. 4, 2003, now Pat. No. 8,099,361.

(51) Int. Cl.
*G06Q 40/00* (2012.01)
(52) U.S. Cl.
USPC .......................................................... 705/40
(58) Field of Classification Search
USPC .......................................................... 705/40
See application file for complete search history.

(56) References Cited

U.S. PATENT DOCUMENTS

| 6,175,823 | B1  |   | 1/2001 | Van Dusen       |        |
|-----------|-----|---|--------|-----------------|--------|
| 7,158,955 | B2  |   | 1/2007 | Diveley et al.  |        |
| 2002/0103753 | A1 | * | 8/2002 | Schimmel     | 705/39 |
| 2002/0111886 | A1 | * | 8/2002 | Chenevich et al. | 705/30 |
| 2003/0061171 | A1 |   | 3/2003 | Gilbert et al.  |        |
| 2004/0019500 | A1 |   | 1/2004 | Ruth            |        |

FOREIGN PATENT DOCUMENTS

WO 00/54122 A1 9/2000

OTHER PUBLICATIONS

W Neilson Hancock. On the present state of the savings' bank question; Journal of the Dublin Statistical Society (1855/1856): 58.*
Edward Atkinson on Specie Payment: Chicago Tribune (1860-1872) [Chicago, Ill] Feb. 23, 1872: 5.*

(Continued)

*Primary Examiner* — Hani M Kazimi
*Assistant Examiner* — Hatem M Ali
(74) *Attorney, Agent, or Firm* — Knobbe, Martens, Olson & Bear, LLP (57) ABSTRACT

A network-based transaction processing system allows users to flexibly and efficiently make payments using a combination of different payment instruments. The system includes a user interface through which a user can define one or more payment plans, each of which may specify a plurality of payment instruments and associated rules for dividing payment amounts among these payment instruments. These rules may be non-transaction-specific, such that a user can re-use a payment plan over time to complete multiple transactions. When placing an order or otherwise initiating a payment transaction, the user can select a payment plan for use in completing the transaction.

24 Claims, 7 Drawing Sheets

(56) References Cited

OTHER PUBLICATIONS

Dodd, William H. Prize essAY on the Jurisdiction of the Local Courts in Ireland, Scotland, and England; Journal of the statistical and Social Inquiry Society of Ireland (1876-1879): 99.*

New Payment Plan . . . Risks; Noel Fung; South China Morning Post, Hong Kong: Nov. 4, p. 2, (1995) (of-record in parent application).

Consideration . . . MBA Program by Tucotte, Margaret M., Ph.D., The University of Connecticut, 1993, 109 pages; AAT 9327353 (of-record in parent application).

Going back . . . college by Johnson Sharon Bolton, Ph.D., University of Miami, 1993, 240 pages; AAT 9412939 (of-record in parent application).

* cited by examiner

FIG. 1

Create a payment plan

User: John Smith

Enter a descriptive name for this plan: [        ]

☑ Use as default for [All Transactions ▼]

Select First Payment Method
(We will use this method first, and will use the next payment method you specify only if this one fails or if a balance remains after we apply the maximum amount)

Maximum amount per purchase transaction. $[        ] (optional)

☐ Visa   39054   Exp: [10]/[2005]

☐ Union Bank Checking Acct. No. XXXXX532

☐ American Express 92657 Exp: [08]/[2005]

☑ Gift Certificate Account (Current Balance = $15.32)

☐ Add a New Gift Card #[        ]   Type [    ▼]

☐ Add a New Credit Card Type [    ▼]   Acct. No. [        ]

Exp: [  ]/[  ]   Billing Address: [        ]

Select Second Payment Method
(We will use this method second, and will use the next payment method you specify only if this one fails or if a balance remains after we apply the maximum amount)

Maximum amount per purchase transaction. $[        ] (optional)

☑ Visa   39054   Exp: [10]/[2005]

☐ Union Bank Checking Acct. No. XXXXX532

☐ American Express 92657 Exp: [08]/[2005]

☐ Gift Certificate Account (Current Balance = $15.32)

☐ Add a New Gift Card #[        ]   Type [    ▼]

☐ Add a New Credit Card Type [    ▼]   Acct. No. [        ]

Exp: [  ]/[  ]   Billing Address: [        ]

Select Third Payment Method

• • •

Add another Payment Method to this Plan

[Save Payment Plan]

*FIG. 2*

User: John Smith

Your Order

| | | |
|---|---|---|
| | Table Lamp Model 4321: | $209.99 |
| | | $ 12.60 (tax) |
| | | 0.00 (shipping) |
| | Total | $222.59 |

Select Payment Option

☐ Visa 39054 Exp: [10] / [2005]

☐ American Express 92657 Exp: [08] / [2005]

⋮

☐ Payment Plan [Primary ▼]    create new payment plan
                [Personal Purchases ▼]
                [Business Purchases ▲]

☐ Select multiple payment methods for this transaction only

Confirm Your Order

Table Lamp Model 4321: $209.99
$ 12.60 (tax)
0.00 (shipping)
Total $222.59

User: John Smith

Payment Information

Selected Payment Plan: Primary  (modify settings for this transaction only)

- Gift Certificate Account: $ 15.32 (No Max Specified)
- Visa 39054: $100.00 (Max You Specified)
- Union Bank Checking Account: $107.27 (remaining balance due)

[Place order]
or
[Go Back]

PAYMENT SERVICE THAT APPLIES USER-SPECIFIED RULES TO DIVIDE PAYMENT AMOUNTS AMONG MULTIPLE PAYMENT INSTRUMENTS

PRIORITY CLAIM

This application is a continuation of U.S. application Ser. No. 10/634,135, filed on Aug. 4, 2003, the disclosure of which is hereby incorporated by reference.

BACKGROUND

1. Technical Field

The present invention relates to transaction processing systems and user interfaces that support the ability for a user to make an online payment using multiple payment instruments.

2. Description of the Related Art

Web sites and other types of interactive systems commonly include functionality for collecting payments from online customers. These systems commonly support a variety of different types of customer payment instruments, such as credit cards, paper and electronic gift certificates, and links to personal bank accounts. Typically, however, existing systems do not allow users to flexibly and efficiently use a combination of different payment instruments to complete a transaction.

SUMMARY

The present invention provides a system through which users can flexibly and efficiently make payments using a combination of different payment instruments or methods. The system includes a user interface through which each user can define one or more personal payment plans. Each such payment plan may specify a plurality of payment instruments, and may specify associated rules that specify how the monetary amount associated with a transaction is to be divided among some or all of these payment instruments. These rules may advantageously be non-transaction-specific, such that a user can re-use a payment plan over time to complete multiple transactions.

In one embodiment, the rules include an indication of an order in which the payment instruments are to be applied. When such an ordering is specified, a failed attempt by the system to use one payment instrument may automatically result in the next payment instrument being used. The rules may also specify maximum per-transaction monetary amounts to be applied to some or all of the payment instruments. For example, a given payment plan may specify that each payment transaction is to be completed as follows: initially use entire gift certificate balance, if any; then apply up to $500 of remaining amount due, if any, to credit card #1, then apply any remaining amount due to credit card #2. Other types of rules may additionally or alternatively be supported; for example, users may be given the option to specify percentages for dividing transaction amounts among the payment instruments, and/or may be permitted to control the behavior of the system when an attempt to use a given payment instrument fails.

Once a payment plan has been created, the user can preferably associate the payment plan with one or more specific orders, or other types of payment transactions, to specify how monetary funds are to be collected by the system. For example, in one embodiment, when placing an order with an online merchant, a user can select a previously-created payment plan to use, or can define a new payment plan to be used. Specific payment plans can thus be reused over time to reduce or eliminate re-entry of multiple-instrument payment information. To process a payment transaction using a specified payment plan, the system applies the associated rules to determine how the total payment amount is to be divided among the payment instruments. The division of the total payment amount may also depend upon whether an attempt to use a particular payment instrument fails.

The use of payment plans as set forth above provides a number of benefits to consumers and merchants For example, because multiple credit cards or other payment instruments may be used, a consumer may be able to complete a given payment transaction even if none of the consumer's payment instruments is currently capable of supplying the entire payment amount (due to credit card limits, insufficient account balances, etc.). In addition, consumers can more easily and flexibly manage the account balances associated with specific payment instruments. Further, even if an attempt to charge one of the payment instruments fails (e.g., due to a processing error or the unavailability of requested funds), the transaction is still likely to go through due to the existence of other payment instruments, reducing the need for customer service involvement. The system may also provide a number of additional features for facilitating consumer use of payment plans. For example, in one embodiment in which a given order can include items selected from multiple different merchants, the user interface allows the user to designate different payment plans to be used for different merchants This may be desirable, for example, where the merchants do not accept the same types of payment methods. The system's user interface may also allow a user to specify that a refund is to be credited to a particular payment plan, which may but need not be the payment plan that was used to place the associated order.

Neither this summary nor the following detailed description is intended to define the invention. The invention is defined by the claims.

DETAILED DESCRIPTION OF THE PREFERRED EMBODIMENTS

For purposes of illustration, the invention will now be described in the context of an electronic catalog system that supports the ability for users to purchase catalog items using payment plans. As will be recognized, the invention may also be used in other types of transaction processing systems that collect payments from online users, including but not limited to systems that provide general purpose user-to-user payment services. In addition, although described in the context of a web-based system, the invention may also be used within other types of interactive systems, such as proprietary online services networks, interactive television systems, and systems that support browsing by voice.

Figure 1:
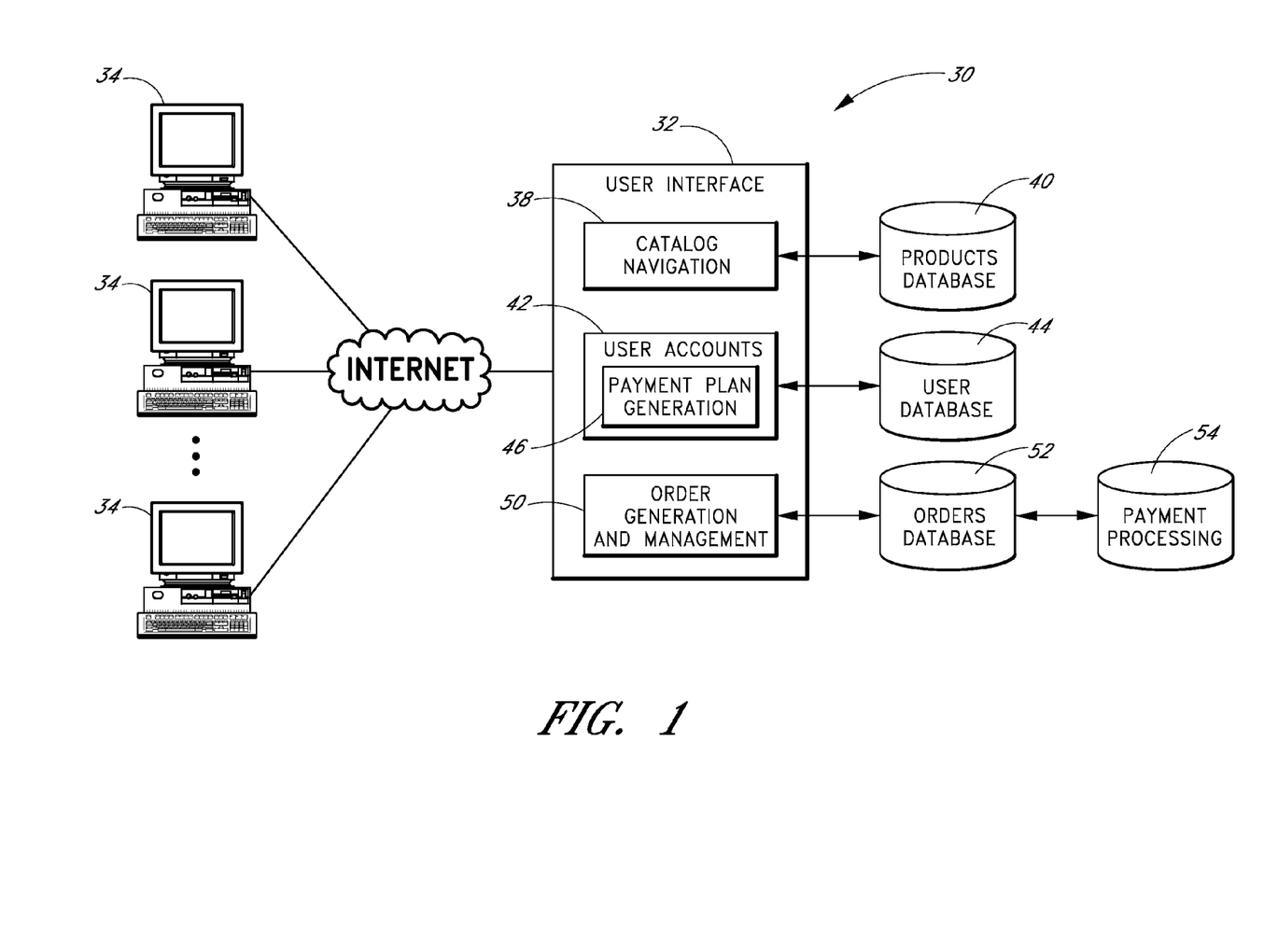
FIG. 1 illustrates the functional components of a network-based electronic catalog system according to one embodiment of the invention.

FIG. 1 illustrates the functional components of an electronic catalog system 30 according to a preferred embodiment of the invention. The system 30 includes a user interface 32 that may be accessed over the Internet by users via user computers 34 and/or other types of user devices (PDAs, cellular telephones, etc.). The user interface 32 preferably comprises web pages that may be viewed using an ordinary web browser, although other types of user interfaces may be used.

As illustrated in FIG. 1, the user interface 32 includes a catalog navigation component 38 that provides various pages and tools for allowing users to browse and make selections from an electronic catalog of products represented within a database 40. The products may include physical products that are shipped to consumers, digital products that are transmitted to the user computers 34 electronically, or a combination thereof. The catalog navigation component 38 may include, for example, a search engine for searching the products database 40, a browse tree for viewing products by category, and product detail pages that display detailed product information and allow users to select specific products for purchase. In some embodiments, the system 30 may allow users to view product offerings and make purchases from two or more different merchants.

The user interface 32 also includes a user accounts component 42 that provides functionality for users to set up and manage personal accounts. User account data collected by the user accounts component 42 is stored in a user database 44. The data stored for a given user may include, for example, authentication information, name, shipping address, and payment information (credit card account information, bank account information, etc.) A user's account data may also include definitions of one or more payment plans, as described below.

As depicted by the block 46 labeled "payment plan generation" in FIG. 1, the user interface 32 also includes functionality (web forms, etc.) for enabling each user to define one or more payment plans. Each such payment plan typically specifies a set of multiple payment instruments (also referred to as payment methods) that may be used to complete payment for specific transactions. A user may wish to define a payment plan in the preferred embodiment for one or both of the following reasons, among others: (1) to cause the system to divide transaction payment amounts among two or more different payment instruments, (2) to increase the likelihood that a transaction will complete successfully if an attempt by the system to use a payment instrument fails.

Each payment plan also preferably specifies rules that govern how the multiple payment instruments are to be used to complete a transaction. For example, each payment plan preferably specifies an order in which the payment instruments or methods are to be applied to collect payment for a transaction. A payment plan may also specify per-transaction maximum payment amounts for some or all of the payment instruments. For instance, a given payment plan may specify that each payment transaction is to be completed as follows: initially use entire gift certificate balance, if any; then apply up to $500 of remaining amount due, if any, to credit card #1, then apply any remaining amount due to credit card #2, etc. Each payment plan can preferably be saved for later use, and can be re-used over time to place multiple orders. As described below, users may also be given the option to define transaction-specific payment plans.

The user interface 32 also includes an order generation and management component 50 that provides functionality for users to place and manage orders for items in the electronic catalog. When a user places an order, the user is preferably given the option to select an existing payment plan, or to define a new payment plan. The user can alternatively specify a single payment method, such as a single credit card, to be used for payment.

The order generation and management component 50 also preferably allows a user to request a refund for a particular order, and to designate a set of payment instruments among which the refund amount is to be divided. For example, in one embodiment, the user can select a payment plan to which the refund amount is to be applied, in which case the same rules used to divide payment amounts may be used to divide the refund amount among the payment instruments. The refund amount may be applied to the same payment plan used to place the associated order, or, in some embodiments, to a different payment plan.

As illustrated, orders created by users are represented within an orders database 52. A payment processing component 54 handles the task of collecting payment for each order, including orders that designate payment plans (see FIG. 6, discussed below). For physical products purchased in-whole or in-part using a credit card, the credit card typically is not charged until after the ordered products are shipped; thus, when the order is placed, the system 30 may only obtain authorization for a charge to a particular credit card account, without actually charging the account.

Figure 2:
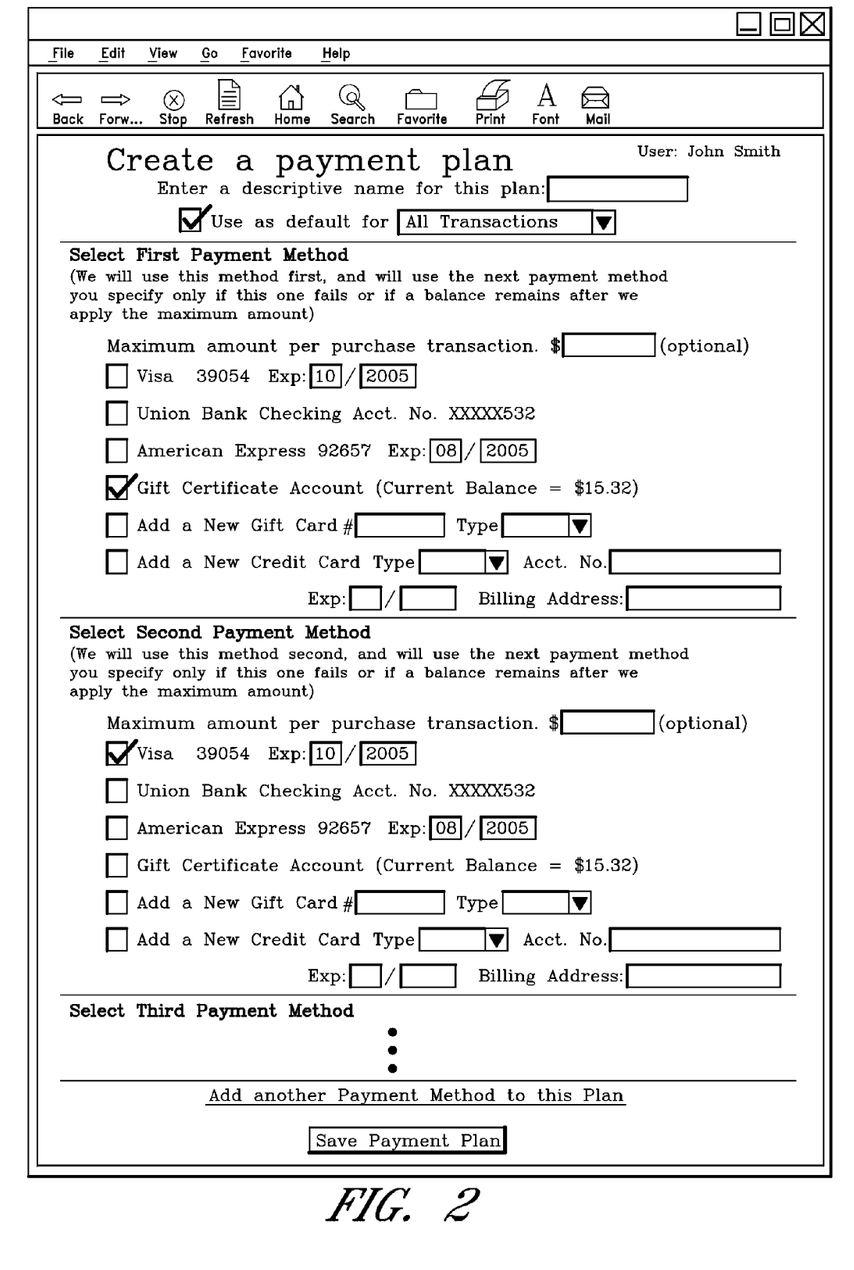
FIG. 2 illustrates an example web page that may be used to create a re-usable payment plan in the system of FIG. 1.

FIG. 2 illustrates one example of a web form that may be used for allowing users to create re-usable payment plans. In this example, it is assumed that the user has previously supplied the details of several specific payment methods/instruments, including two credit card accounts and a checking account. In addition, it is assumed that the system 30 maintains personal gift certificate accounts for users, and allows users to apply their respective gift certificate balances to specific orders. The web form allows the user to specify any desired number of payment methods or instruments, with the first having the highest priority, the second having the second highest priority, and so on. The user can specify a payment method either by selecting a checkbox next to one of the listed payment methods, or by supplying the details for a new payment method.

For each specified payment instrument, the user can also enter a per-transaction maximum monetary amount. When such a maximum is specified, the monetary amount applied to that payment instrument for any given transaction will be less than or equal to the specified maximum. For example, if a user places an order for $200 using payment plan that designates a $100 limit for the first payment method, this first payment method will be used to collect the first $100 of the purchase price (assuming an attempt to use the first payment method is successful), and the remaining $100 will be collected using one or more subsidiary payment instruments. If a credit card account is specified as the first payment instrument in a payment plan, a maximum will typically need to be specified for that credit card account if the user wants transaction payment amounts to be divided among two or more of the specified payment instruments. The option to specify maximum payment amounts may be omitted in other embodiments, in which case the total payment amount may be divided among payment instruments using a different method, or may be collected solely using the first payment method that is not declined.

As indicated by the explanatory text in FIG. 2, when an attempt to use a particular payment method fails in the illustrated embodiment, the next payment method in the sequence is used (as opposed, for example, to automatically treating the transaction as unsuccessful). This aspect of the system increases the likelihood that transactions will be completed successfully. In an alternative embodiment, a transaction is treated as unsuccessful if any attempt to collect funds from a payment instrument is unsuccessful. Yet another option is to allow a user to specify, as part of the rules associated with a payment plan, whether the next sequential payment instrument should be used if the current payment instrument fails.

Although not depicted in FIG. 2, the user interface may additionally or alternatively support entry of other types of rules for governing the use of the multiple payment instruments. For example, the user interface may allow the user to specify a percentage of the overall transaction amount to be allocated to each payment instrument. These percentages may then be used by the payment processing component 54 to divide the total transaction amount among the multiple payment instruments.

As illustrated near the top of FIG. 2, the user may also be given the option to specify whether this payment plan is to be used as the default payment plan for some or all transactions. The associated drop down box may allow the user to set the payment plan as the default for one or more of the following types of transactions: (a) all transactions with a particular merchant, (b) all purchases of a particular type of item, (c) all purchases that exceed or that fall below a particular monetary amount.

Once all of the details of a payment plan have been entered, the user can save the payment plan under a descriptive name for later use. A given user may create any desired number of payment plans in the preferred embodiment, and select between these payment plans (and other payment options) when initiating payment for an order. As described below, the system may also allow a user to create a transaction-specific payment plan that is used only for a single transaction.

Figure 3:
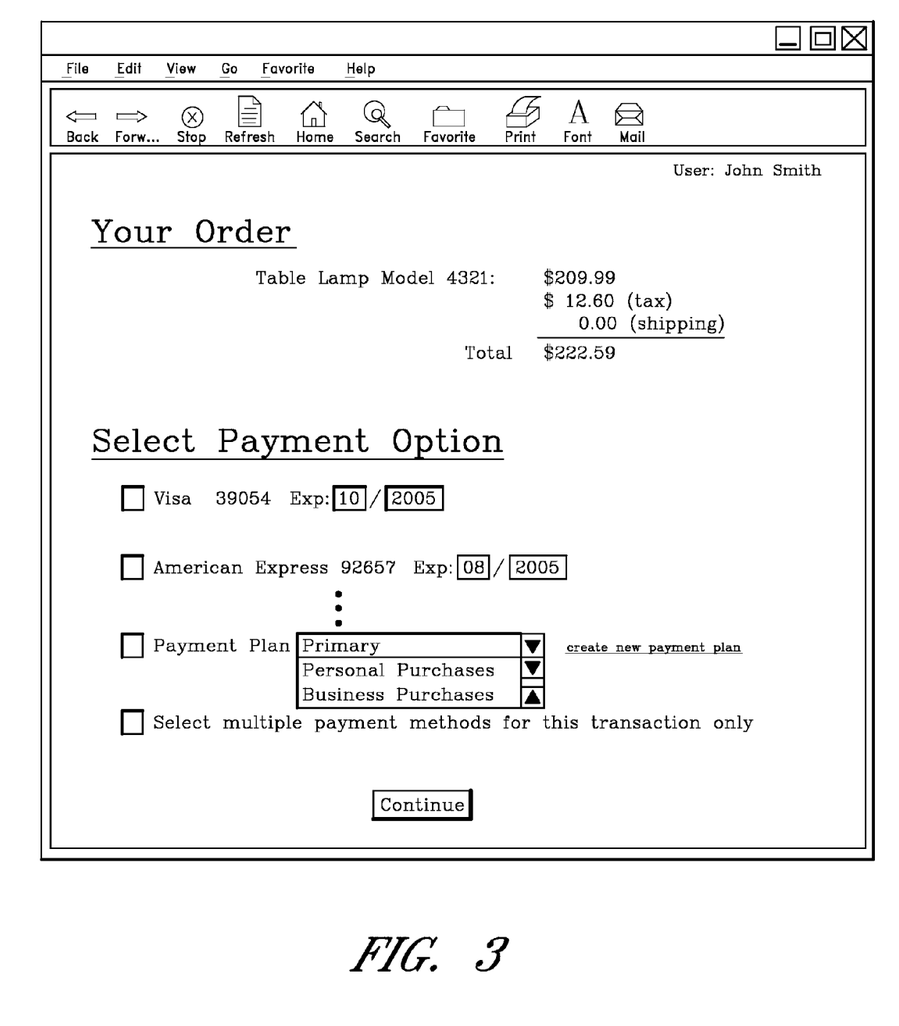
FIG. 3 illustrates an example web page that may be used to select between various payment options in the system of FIG. 1.

FIG. 3 illustrates an example page that may be used to obtain payment information for a user for an order being placed. In this example, the order is for a single product (table lamp) selected from the electronic catalog. The user is prompted to select from a list of possible payment options to pay for this item. This list includes specific credit cards that are on file for the user, and includes an option to select a previously-created payment plan. A drop-down list displays the names of three existing payment plans the user has created ("primary," "personal purchases," and "business purchases"), and allows the user to select one of these payment plans. A "create new payment plan" link is also provided for allowing the user to add a new payment plan. The list of payment options also includes a checkbox for allowing the user to specify multiple payment methods/instruments to create a transaction-specific payment plan. Once a payment option has been selected, the user can select the "continue" button to proceed with the checkout process.

Figure 4:
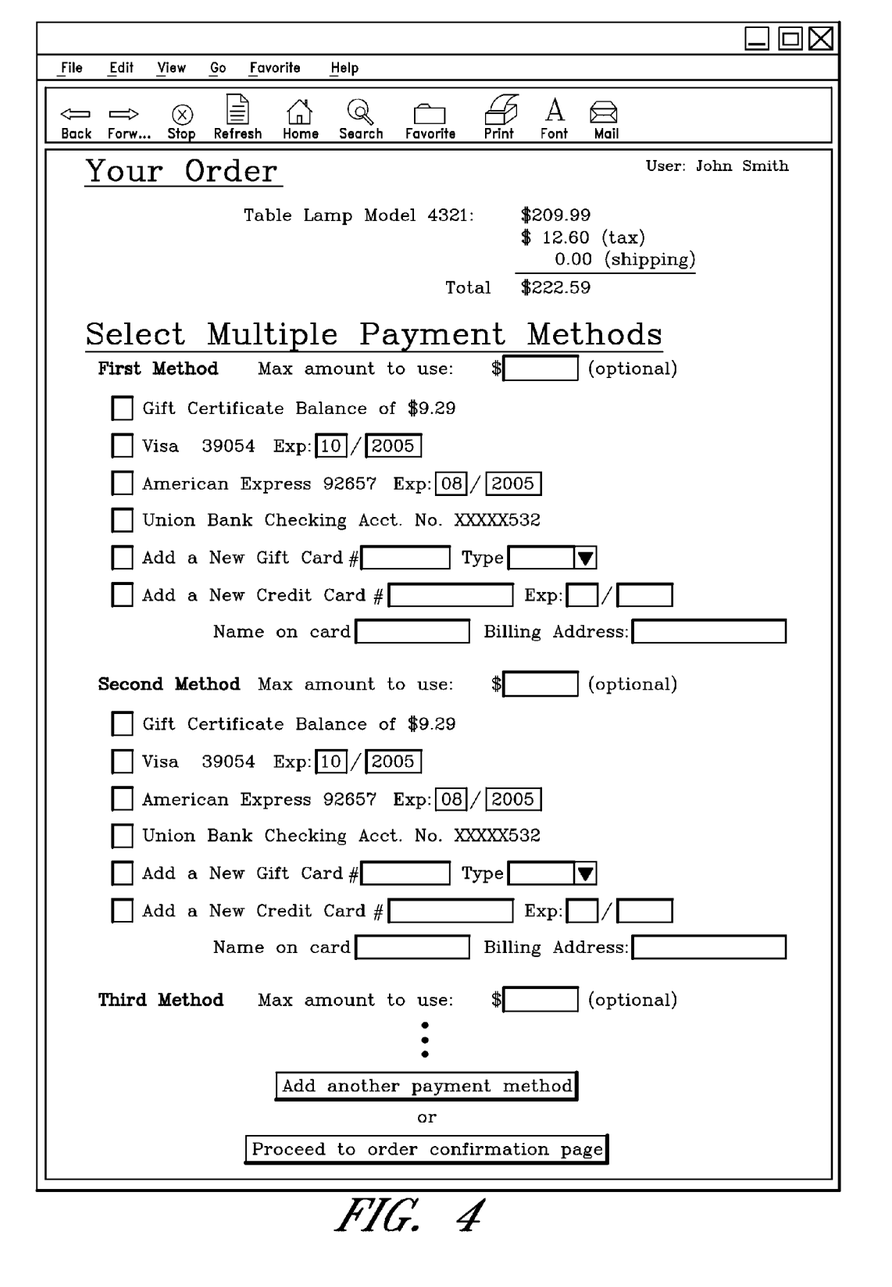
FIG. 4 illustrates an example web page that may be used to create a transaction-specific payment plan.

FIG. 4 illustrates an example page that may be displayed when the user selects the option "select multiple payment methods for this transaction only" in FIG. 3 to create a transaction-specific payment plan. As with the page shown in FIG. 2, this page allows the user to specify an ordered set of payment methods to be used. The user can also optionally specify maximum monetary amounts to be used for each of the payment methods. In this example, because the user currently has a gift certificate balance, the user is given the option to use this balance as one of the payment methods. The user can also specify a new gift card or credit card to use as a payment method.

Figure 5:
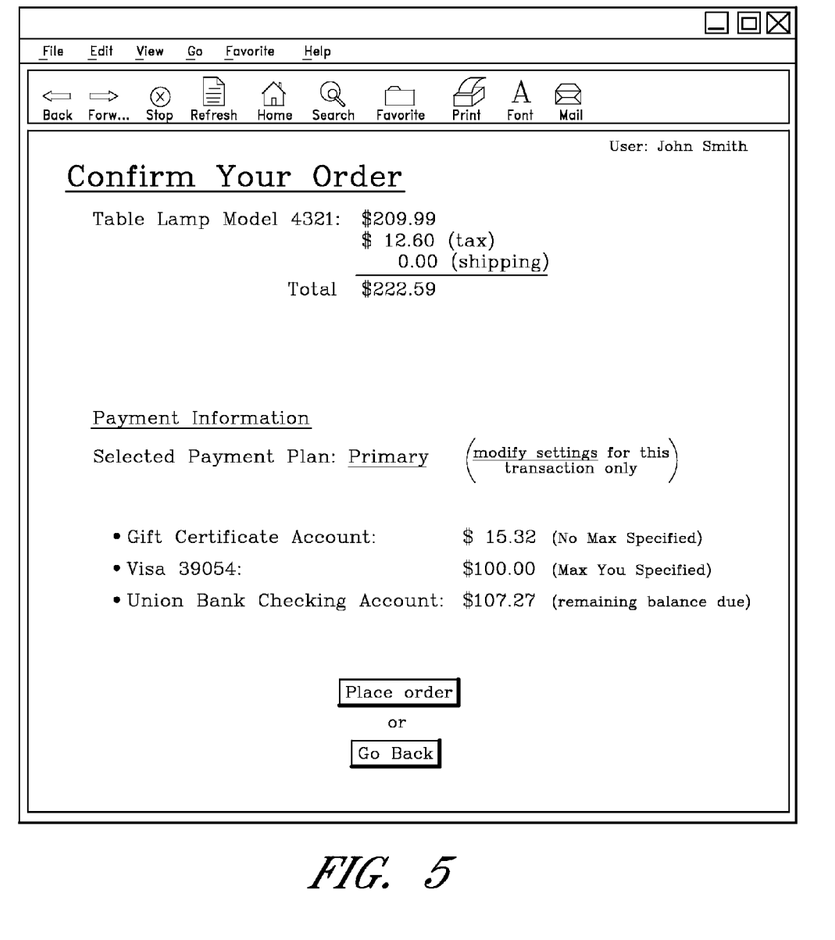
FIG. 5 illustrates an example order confirmation page.

FIG. 5 illustrates an example order confirmation page of the type that may be displayed when a user pays with a payment plan. In this example, the user has selected a payment plan that is saved under the name "primary." This payment plan includes at least three payment methods/instruments: a gift certificate account, a Visa credit card account, and a checking account with a bank. The order confirmation page indicates the amount that will be charged or applied to each such instrument, and indicates whether a maximum amount was specified by the user for each instrument. Credit card authorizations may be obtained prior to generation of the order confirmation page so that the displayed dollar amounts accurately reflect the amounts that will actually be charged to the credit card accounts. In addition, for the gift certificate account, the requisite funds ($15.32 in this example) may be encumbered prior to generation of the order confirmation page to prevent these funds from being used for a different transaction prior to completion of this transaction. If a credit card authorization fails during order placement, the order confirmation page may display an indication of the failure, and may show a different division of the total transaction amount among the available payment methods.

Figure 6:
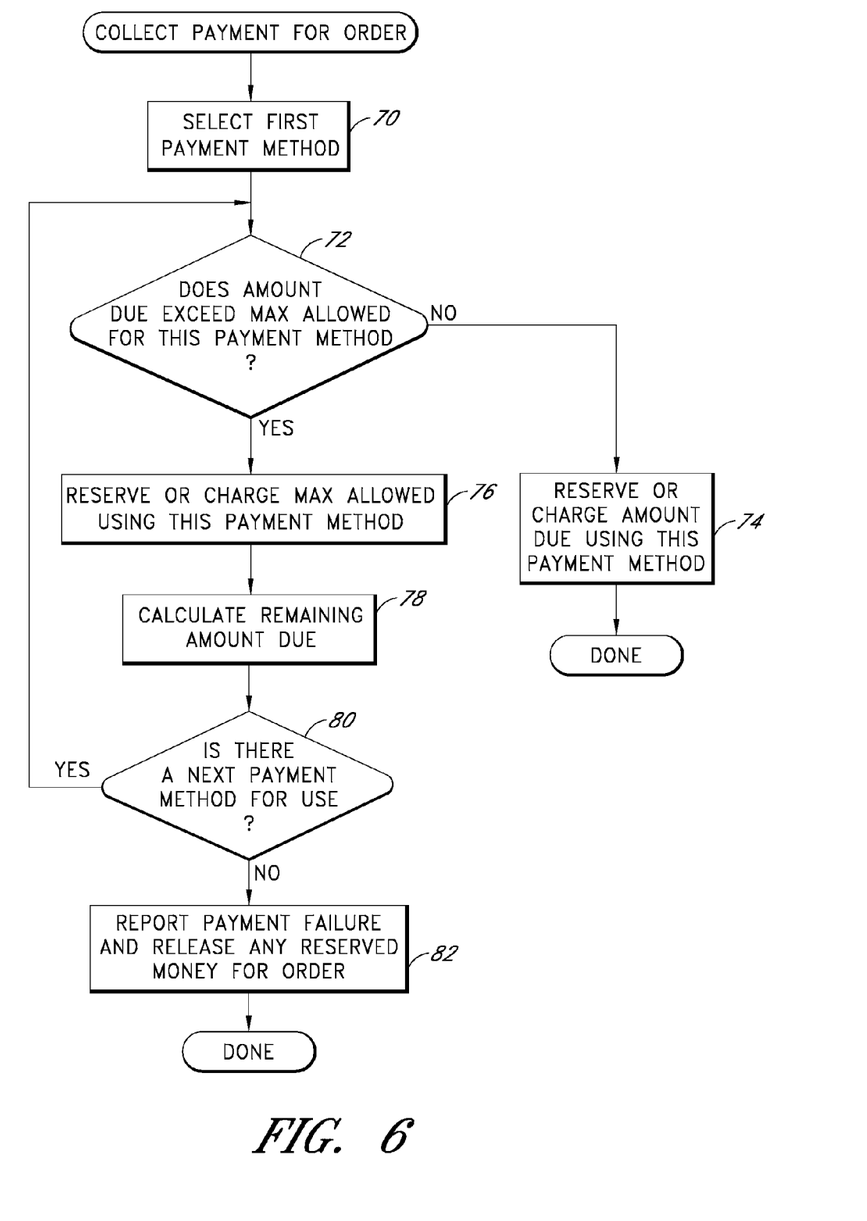
FIG. 6 illustrates the process flow that may be used by the payment processing component of FIG. 1 when a payment plan is used to collect payment.

FIG. 6 illustrates the general flow of a computer process that may be implemented within the payment processing component 54 (FIG. 1) to reserve or collect funds when a payment plan is used. The same or a similar process may be used to determine the amounts to be charged or applied to each instrument. As depicted by blocks 70 and 72, the process initially selects the first payment method in the user-specified sequence, and determines whether the total amount of the transaction exceeds the maximum amount (if any) specified for this payment method. If the first payment instrument is an account, such as a gift certificate account, maintained by an operator of the system 30, this maximum amount may be the amount of funds available in the account.

If the outcome of the determination in block 72 is negative, the first payment method is used to collect the entire amount of the transaction (block 74), and the process ends. Rather than actually charging the associated payment instrument at this point, the funds may be reserved or encumbered, and the actual charge may be made at a later time (such as when the order ships). If the outcome of the determination in block 72 is positive, the first payment method is used to collect the maximum amount allowed for the first payment method (block 76). The process then calculates the remaining amount due (block 78) and determines whether the payment plan includes a next payment method (block 80). If the determination in block 80 is positive, the process selects the next (second) payment method in the sequence, and goes back to block 72. If, on the other hand, no additional payment methods are specified, a payment failure is reported and any funds reserved in block 76 are released (block 82). The sequence of events represented by blocks 72-78 continues until either the entire amount of the transaction has been accounted for or a determination is made that the transaction amount cannot be collected using the payment plan.

In one embodiment, if an attempt to use a particular payment method in block 72 or block 74 is unsuccessful, the process skips that payment method and continues at block 72 with the next payment method. Thus, even though an attempt to use a particular payment method may fail, the transaction may complete successfully using other specified payment methods/instruments.

In one embodiment of the system 30 (not shown), a user can select items from multiple different merchants, and then place a single order to purchase these items from these merchants. In such scenarios, the user interface 32 may permit the user to designate a different respective payment plan (or a single payment method) for each merchant Users can thus create and use merchant-specific payment plans, if desired. The system may also support the ability for a user to designate a particular payment plan as being the default for a particular merchant or transaction type.

Figure 7:
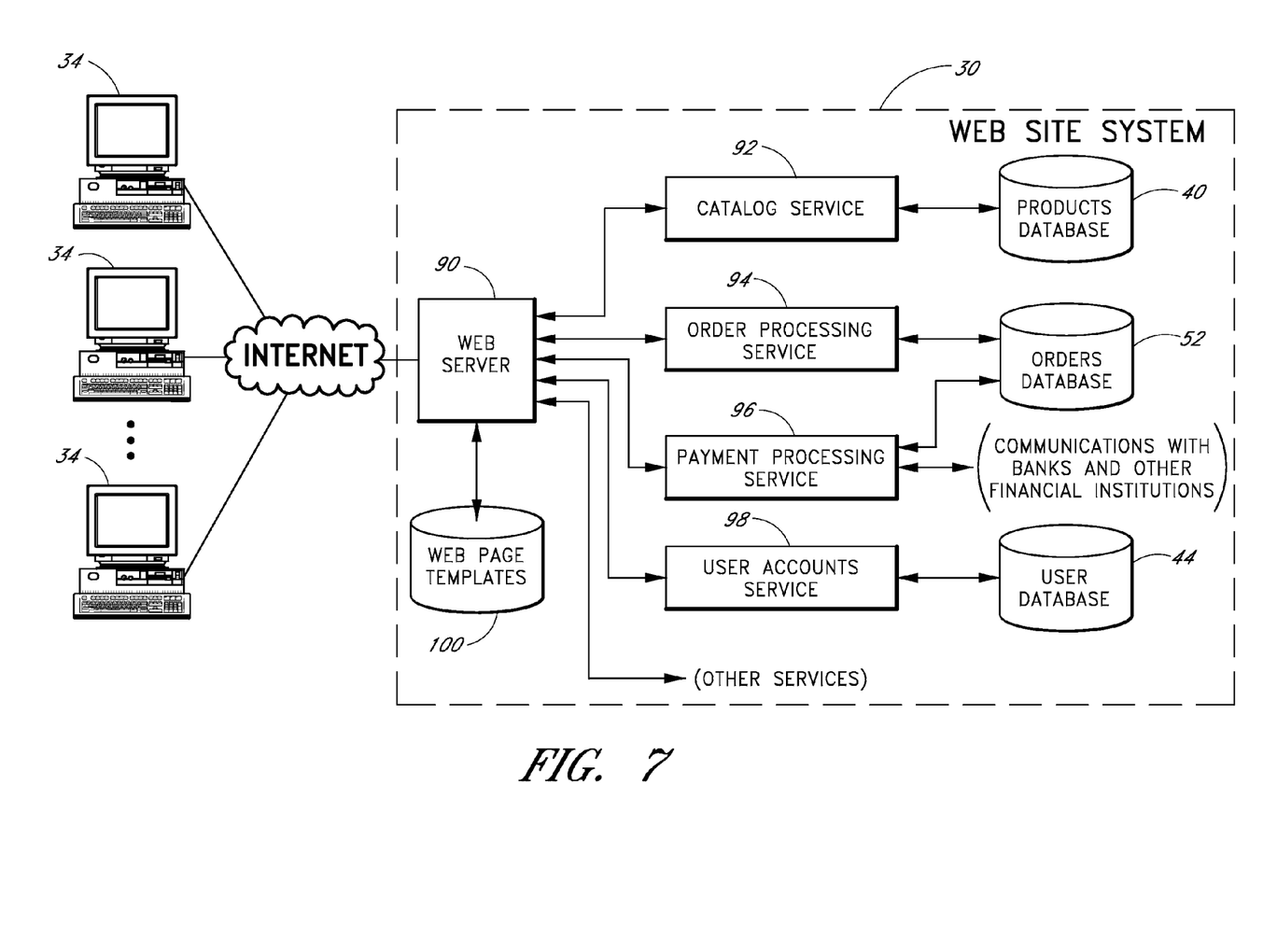
FIG. 7 illustrates a set of web site components that may be used to implement the system of FIGS. 1-6.

FIG. 7 illustrates an example set of web site components that may be used to implement the system 30. In this example, the web site system 30 includes a web server 90 that communicates with a set of web services, including a catalog service 92, an order processing service 94, a payment processing service 96, and a user accounts service 98. The web server 90 and each web service 92-98 may, for example, be implemented using a different respective physical server or set of physical servers, although numerous other allocations of software-implemented functionality to machines are possible. The web server 90 accesses a database of web page templates 100 that specify the general layout and content of each web page, and specify the service calls needed to populate the web pages and to process user submissions of data. For example, a separate template may be provided for each of the web pages shown in FIGS. 2-5.

The catalog service 92 is generally responsible for returning catalog information, including product descriptions, for display within specific web pages. The order processing service 94 is generally responsible for the creation and management of orders placed by users. The payment processing service 96 is generally responsible for handling the workflows associated with the various supported payment instruments, and for using payment plans to collect payments as depicted in FIG. 6. The user accounts service 98 is generally responsible for returning user account data, and for updating such data, in response to service calls. Numerous other services may be provided to support other types of functions.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by reference to the appended claims

What is claimed is:

1. A method performed by an electronic transaction processing system to execute a purchase transaction, the method comprising:
recording a selection by a user of one or more items from an electronic catalog of items;
providing a payment interface that enables the user to place an order for the one or more selected items via a user computing device, said payment interface providing an option for the user to select a pre-generated, re-usable payment plan to use to pay for the one or more items, said payment plan specifying at least (1) a plurality of payment instruments associated with the user, and (2) non-transaction-specific rules that specify how the plurality of payment instruments are to be used in combination to process payment transactions;
accepting a selection made by the user via the payment interface of the payment plan in connection with said order; and
determining, based on the non-transaction-specific rules of the payment plan, how to divide a payment amount of said order among the plurality of payment instruments; said method performed in its entirety by a computer system that comprises one or more physical servers.

2. The method of claim 1, wherein the non-transaction-specific rules specify at least the following: (a) an order in which the payment instruments are to be used to process the payment transactions, and (b) for at least one of the payment instruments, a maximum monetary amount to be applied thereto.

3. The method of claim 2, wherein determining how to divide the payment amount comprises determining a first portion of the payment amount to be applied to a first payment instrument, said first portion being equal to and based on said maximum monetary amount, and determining a second portion of the payment amount to be applied to one or more other payment instruments.

4. The method of claim 1, wherein determining how to divide the payment amount comprises determining, based at least partly on percentages specified by the payment plan, a first amount to be applied to a first payment instrument and a second amount to be applied to a second payment instrument.

5. The method of claim 1, wherein the plurality of payment instruments include at least one credit card account and at least one non-credit-card account.

6. The method of claim 1, wherein the payment interface provides an option for the user to select from a plurality of pre-generated, re-usable payment plans associated with an account of the user.

7. The method of claim 6, wherein the payment interface provides an option for the user to select different payment plans for different items in said order.

8. The method of claim 1, wherein the payment interface provides an option for the user to select at least one payment method that does not involve use of a payment plan.

9. The method of claim 1, further comprising, prior to recording the user's selection of the one or more items, receiving an electronic submission from the user of the payment plan, said submission generated via a payment plan creation interface.

10. An electronic order generation and processing system, comprising:
a computer data repository that stores, in association with a user, a definition of a re-usable payment plan created by the user, said payment plan specifying at least (1) a plurality of payment instruments associated with the user, and (2) a set of non-transaction-specific rules specifying how the plurality of payment instruments are to be used in combination to process payment transactions;
a server that provides an order generation user interface that includes functionality for the user, via a user computing device, to generate an order for one or more items selected from an electronic catalog, and to select the payment plan for use in paying for the order; and
an order processing system that is responsive to user selection of the payment plan for said order by using the set of non-transaction-specific rules to determine how to divide a monetary amount of the order among the plurality of payment instruments.

11. The order generation and processing system of claim 10, wherein the set of non-transaction-specific rules specify at least the following: (a) an order in which the payment instruments are to be used to process the payment transactions, and (b) for at least one of the payment instruments, a maximum monetary amount to be applied thereto.

12. The order generation and processing system of claim 11, wherein the order processing system, in determining how to divide the payment amount, is configured to determine a first portion of the payment amount to be applied to a first payment instrument, said first portion being equal to and based on said maximum monetary amount, and to determine a second portion of the payment amount to be applied to one or more other payment instruments.

13. The order generation and processing system of claim 10, wherein the order processing system, in determining how to divide the payment amount, is configured to determine, based at least partly on percentages specified by the payment plan, a first amount to be applied to a first payment instrument and a second amount to be applied to a second payment instrument.

14. The order generation and processing system of claim 10, wherein the plurality of payment instruments include at least one credit card account and at least one non-credit-card account.

15. The order generation and processing system of claim 10, wherein the order generation user interface provides an option for the user to select from a plurality of re-usable payment plans associated with the user, each payment plan including a respective set of non-transaction-specific rules for using multiple payment instruments in combination.

16. The order generation and processing system of claim 15, wherein the order generation user interface additionally provides an option for the user to select different payment plans for different items in said order.

17. The order generation and processing system of claim 10, wherein the order generation user interface additionally provides an option for the user to select at least one payment method that does not involve use of a payment plan.

18. The order generation and processing system of claim 10, further comprising a payment plan generation user interface that provides functionality for the user to create said payment plan, including selecting multiple payment instruments and specifying said rules.

19. The order generation and processing system of claim 10, wherein the payment plan additionally specifies a type of transaction for which the payment plan is to be used by default.

20. Physical computer storage that stores executable software that directs a computing system to implement a process that comprises:

recording a selection by a user of one or more items from an electronic catalog of items;

providing an order generation interface that enables the user to place an order for the one or more selected items via a user computing device, said order generation interface providing an option for the user to select a pre-generated, re-usable payment plan to use to pay for the one or more items, said payment plan specifying at least (1) a plurality of payment instruments associated with the user, and (2) non-transaction-specific rules that specify how the plurality of payment instruments are to be used in combination to process payment transactions;

accepting a selection by the user via the payment interface of the payment plan in connection with said order; and determining, based on the non-transaction-specific rules of the payment plan, how to divide a payment amount of said order among the plurality of payment instruments.

21. The physical computer storage of claim 20, wherein the non-transaction-specific rules specify at least the following: (a) an order in which the payment instruments are to be used to process the payment transactions, and (b) for at least one of the payment instruments, a maximum monetary amount to be applied.

22. The physical computer storage of claim 20, wherein the process comprises outputting, via the order generation interface, a listing of a plurality of previously-created payment plans associated with the user, including names of said previously-created payment plans, and determining a payment plan selection made by the user from said listing.

23. The method of claim 1, wherein the method comprises outputting, via the payment interface, a listing of a plurality of previously-created payment plans associated with the user, including names of said previously-created payment plans, and determining a payment plan selection made by the user from said listing.

24. The order generation and processing system of claim 10, wherein the order generation interface provides functionality for the user to view a listing of payment plans created by the user, including names of said payment plans, and to select the payment plan from said listing.

* * * * *